(12) United States Patent
Weitkamp et al.

(10) Patent No.: US 9,169,830 B2
(45) Date of Patent: Oct. 27, 2015

(54) ROTOR BLADE DE-ICING

(71) Applicant: REPOWER SYSTEMS SE, Hamburg (DE)

(72) Inventors: Roland Weitkamp, Belm (DE); Peter Quell, Osterronfeld (DE)

(73) Assignee: SENVION SE, Hamburg (DE)

( * ) Notice: Subject to any disclaimer, the term of this patent is extended or adjusted under 35 U.S.C. 154(b) by 0 days.

(21) Appl. No.: 13/715,453

(22) Filed: Dec. 14, 2012

(65) Prior Publication Data
US 2013/0101414 A1 Apr. 25, 2013

Related U.S. Application Data

(63) Continuation of application No. PCT/EP2011/002994, filed on Jun. 17, 2011.

(30) Foreign Application Priority Data

Jun. 24, 2010 (DE) .......................... 10 2010 030 472

(51) Int. Cl.
*F03D 11/00* (2006.01)
*F03D 1/06* (2006.01)

(52) U.S. Cl.
CPC .......... *F03D 11/0025* (2013.01); *F03D 1/0675* (2013.01); *F03D 1/0683* (2013.01); *F05B 2240/30* (2013.01); *Y02E 10/721* (2013.01); *Y02E 10/722* (2013.01)

(58) Field of Classification Search
CPC ..... F01D 25/02; F03D 11/0025; F03D 3/061; F03D 3/062; F05B 2260/20; F05B 2260/208

USPC .................. 416/1, 90 R, 92, 93 R, 95, 96, 39; 415/177, 178

See application file for complete search history.

(56) References Cited

U.S. PATENT DOCUMENTS 2,320,870 A * 6/1943 Johnson ...................... 244/123.8
2,510,170 A * 6/1950 Chillson et al. ........... 244/134 B
(Continued)

FOREIGN PATENT DOCUMENTS

DE 19621485 3/1998
EP 1375913 1/2004
WO WO 2008086805 * 7/2008

OTHER PUBLICATIONS

International Search Report filed in PCT/EP2011/002994.
(Continued)

*Primary Examiner* — Nathaniel Wiehe
*Assistant Examiner* — Brian O Peters
(74) *Attorney, Agent, or Firm* — Rankin, Hill & Clark LLP

(57) ABSTRACT

A rotor blade (10) of a wind power plant having a first and a second duct (16, 17) running inside the rotor blade (10) for conducting an air flow (21, 22) is provided. A method for de-icing a rotor blade (10) of a wind power plant is also provided. The rotor blade has a partition device (15) which separates the ducts (16, 17) from one another, such that the first duct (16) is arranged on a first side of the partition device (15) at the pressure side (26) of the rotor blade (10), and the second duct (17) is arranged on a second side of the partition device (15) at the suction side (25) of the rotor blade (10). In the method, the flow speed of the air flow provided in the first and second duct (16, 17) is predefined at least in portions of the rotor blade (10).

17 Claims, 7 Drawing Sheets

(56) References Cited

U.S. PATENT DOCUMENTS

Figure 1:
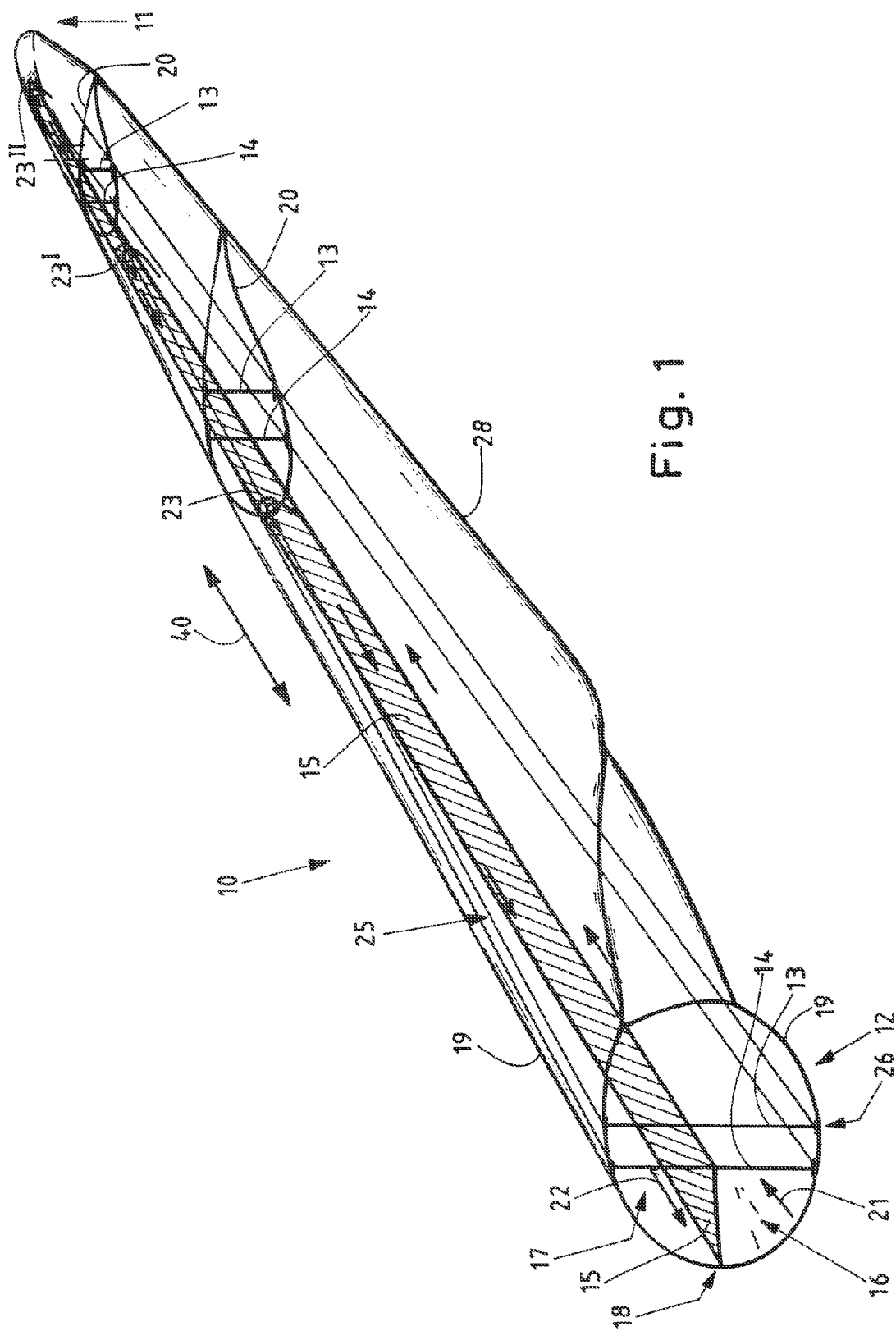

| | | | | |
|---|---|---|---|---|
| 2,556,736 | A * | 6/1951 | Palmatier | 244/134 B |
| 4,295,790 | A * | 10/1981 | Eggert, Jr. | 416/226 |
| 6,676,122 | B1 * | 1/2004 | Wobben | 290/55 |
| 7,217,091 | B2 * | 5/2007 | LeMieux | 416/95 |
| 8,029,239 | B2 * | 10/2011 | Luetze | 416/91 |
| 2004/0041408 | A1 * | 3/2004 | Casazza | 290/55 |

OTHER PUBLICATIONS

Burton, Tony et al.; Wind Energy Handbook, Copyright 2001, John Wiley & Sons, ltd.

* cited by examiner

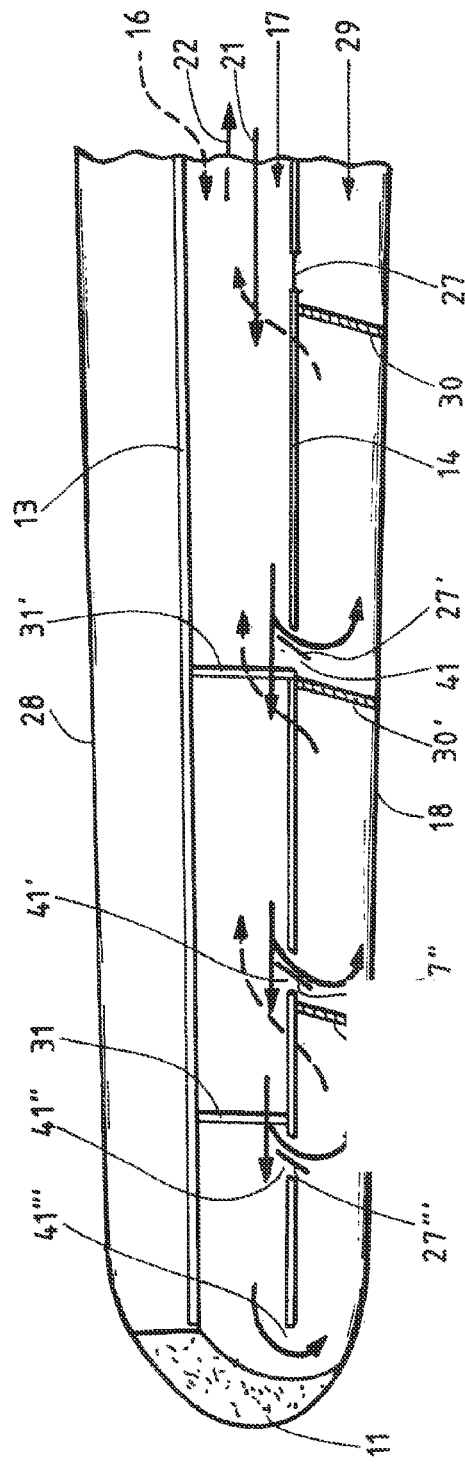
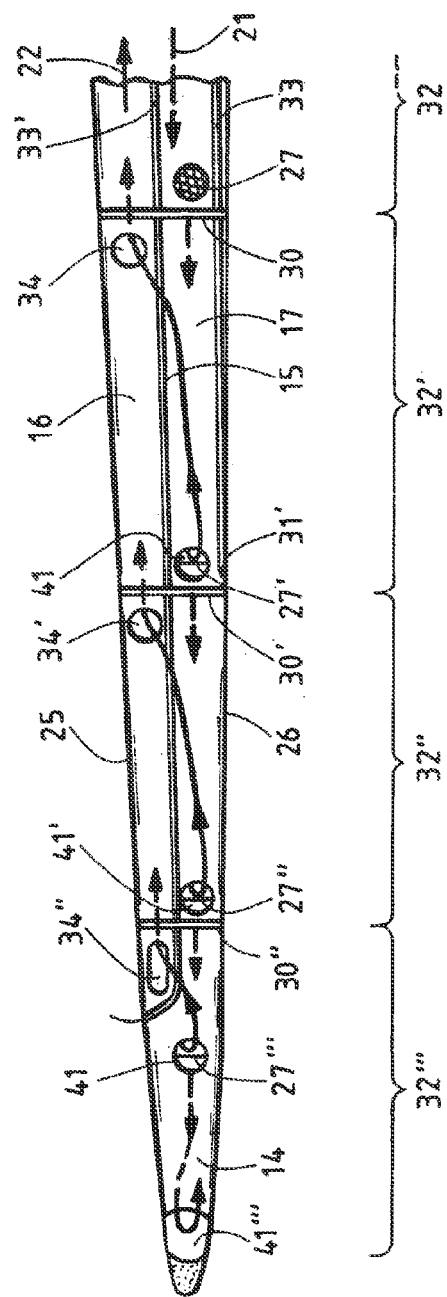

ROTOR BLADE DE-ICING

DESCRIPTION

The invention relates to a rotor blade of a wind power plant having a first and a second duct running inside the rotor blade for conducting an air flow. The invention also relates to a method for de-icing a rotor blade of a wind power plant, wherein the rotor blade has a first and a second duct inside the rotor blade for conducting an air flow, wherein the air flow comprises a heated air flow that is fed into the first duct, and flows at least in sections in the direction from the rotor blade root to the rotor blade tip in a predefinable flow guidance, and for de-icing of at least one section of the rotor blade flows along to at least a part of an exterior wall of the rotor blade, wherein the air flow, after being cooled off, is guided back through the second duct to the rotor blade root.

Rotor blades with apparatuses that serve for de-icing the rotor blades, and corresponding methods for de-icing rotor blades are known. For this, reference is made to the document U.S. Pat. No. 7,217,091 B2 for example, in which warm air is guided by means of a warm air fan along in a duct at the rotor blade leading edge, is cooled there by the ambient air and the temperature of the material of the rotor blade shell at the leading edge, and after passage from the rotor blade root to the rotor blade tip, flows back in a further duct, which substantially completely surrounds the front duct and is disposed in the direction of the trailing edge of the blade. The returned air flow is reheated by means of a heating element and sent back into the flow circulation. In this, the temperature of the heated air flow is adjusted.

From the document EP 0 842 360 B1, a method is also known for de-icing a rotor blade of a wind power plant that has pipes communicating with one another through which a heat carrying medium, preheated where applicable, is led, wherein the heated heat carrying medium after flowing through a cavity on the leading edge side of the blade with corresponding heat dissipation to regions of the blade wall is redirected in a cavity at the trailing edge side of the blade, and is led off from there.

It is the object of the present invention to provide a more efficient de-icing of a rotor blade.

This object is solved by a rotor blade of a wind power plant having a first and a second duct running inside the rotor blade for conducting an air flow, wherein a partition device is provided which separates the ducts from one another so that the first duct is disposed on a first side of the partition device to the pressure side of the rotor blade, and the second duct is disposed on a second side of the partition device toward the suction side of the rotor blade.

A more efficient de-icing is possible using the rotor blade according to the invention because warm air can be supplied to a smaller area of the outer shell of the rotor blade so that an efficient de-icing is possible also at lower heating power. The first and the second duct are preferably connected together, and particularly in the region of the rotor blade tip. One of the two ducts serves for supplying warm air in the direction of the rotor blade tip, and starting from the rotor blade root, and the other duct serves for the return of cooled air. A warm air blower or a fan with a heater that is connected to the corresponding ducts can be provided for example in the region of the rotor blade root or in the region of a rotor hub of a rotor with corresponding rotor blades of a wind power plant. In particular, it is preferable if the supply air duct, thus the first or second duct, which is provided for the supply of warm air starting from the rotor blade root in the direction of the rotor blade tip, is connected to a corresponding fan.

The partition device preferably is, or comprises, a partition wall at least in sections that is disposed substantially in the longitudinal extent of the rotor blade and transverse to a web of the rotor blade, wherein the web extends from the suction side to the pressure side of the rotor blade, and is disposed substantially in the longitudinal extent of the rotor blade. This enables very good separation of the first and the second duct to the suction side, or respectively to the pressure side, of the rotor blade. Such a partition device, in particular, is simple to produce. The ducts are preferably air conducting ducts which guide a warm air flow and air flow cooled in the course of the air flow.

The first duct and/or the second duct preferably have an exterior wall of the rotor blade as a wall, and/or the first and/or the second duct have at least one opening in a wall of the first and/or the second duct which allows a connection to a third duct, wherein the third duct has an exterior wall of the rotor blade as a wall. This enables a very efficient heating of the exterior wall, particularly to the leading edge of the rotor blade. The exterior wall is particularly a rotor blade shell, or respectively a part of the rotor blade shell. The exterior wall, which is provided as a wall of the first, second and/or third duct, is preferably an exterior wall, or respectively a wall, or respectively a shell, of the rotor blade in the region of the leading edge of the rotor blade.

Particularly preferred is an embodiment in which the first duct and/or the second duct is disposed between two webs of the rotor blade, wherein the webs are disposed substantially in the longitudinal extent of the rotor blade and each extend from the pressure side to the suction side of the rotor blade. With this particularly preferred variant of the rotor blade according to the invention, it is possible to guide heated air without large heat losses to the rotor blade tip, or respectively to the outer region of the rotor blade, thus to the region of the rotor blade that is provided removed from the rotor blade root. In particular, it is preferred that at least one wall of the first or the second duct is designed heat insulated at least in sections. Hereby, it is possible to conduct a heated air flow without large heat losses to the regions which are to be de-iced. Preferably, two or more walls, particularly preferably all walls of the first or second duct are designed heat insulated. A heat insulated design is understood to mean in particular that a corresponding heat insulation is provided, wherein a thermal conductivity is provided, particularly preferably below 0.11 W/(m·K).

The shell material of the rotor blade in the region of the leading edge of the rotor blade is preferably permeated with thermal conductive material. The shell material is preferably glass fiber reinforced plastic or similar material used in the construction for rotor blades of wind power plants. In order to accelerate a de-icing and to permit a good heat transfer from the warm air flow inside the rotor blade, or respectively in a duct in the rotor blade, toward the outside to the ice, a corresponding thermal conductive material is used that permeates the shell material of the rotor blade. A thermal conductive material is understood to be a material that has thermal conductivity which is at least double the thermal conductivity of the shell material. The thermal conductivity of the thermal conductive material is preferably at least ten times, preferably fifty times as large as that of the shell material.

Preferably a lightweight metal is used, such as aluminum for example. A thermal conductive shell material such as graphite or Kevlar fiber mats can also be used. Preferably the permeation occurs using fibers or wires which completely pass through the shell material transverse to the shell material. The thermal conductivity is preferably greater than 10 W/(m·K). The concept that the shell material is permeated with thermal conductive material, is understood, particularly in the scope of the invention, to mean that the shell material is comprised at least partially of this thermal conductive material and/or thermal bridges are provided from inside to the outside. It is also possible that the shell material is provided with a corresponding highly conductive powder or granulate. Furthermore, a thermal conductive fiber material and/or a thermal conductive resin for hardening the glass fiber reinforced plastic can also be used.

The first and/or the second duct is preferably disposed at an offset to the exterior walls of the rotor blade. This way, at least one of the ducts can receive a heated air flow, and can conduct the flow to the locations to be heated with relatively small loss of heat. In particular, the walls of these ducts can then be designed heat insulated, or respectively heat insulating. In particular, the supply air duct is offset from the exterior walls of the rotor blade. If both ducts are distanced from the exterior walls of the rotor blade, both ducts can be used as a supply air duct, and even interchangeably for example, such that initially the first duct serves as a supply air duct and the second duct serves as a discharge air duct, or respectively a removal duct, and at another time the second duct serves as a supply air duct and the first duct serves as a removal duct. The first and/or the second duct are then designed in particular as ducts which receive a heated air flow, which guide the air flow at least in sections in the direction of the rotor blade tip.

The object is further solved by a rotor blade of a wind power plant having a first and a second duct running inside the rotor blade for conducting an airflow that preferably has the preceding features of the rotor blade according to the invention or the further developed rotor blade, wherein the first and/or the second duct has a flow restricting apparatus. In the scope of the invention, having a flow restricting apparatus also comprises the presence of a flow restricting apparatus in a partition device between the first and the second duct.

Providing a flow restricting apparatus in the rotor blade according to the invention makes it possible in a simple manner to set, or respectively to specify, the flow speed of the air flow, particularly the warm air flow also in the rotor blade tip. Due to the continuity law, the flow speed of the air is always increasing due to the decreasing cross section toward the rotor blade tip. If a flow restricting apparatus is provided, preferably also toward the rotor blade root, this can be used for equalizing the flow speed of the air flow so that a correspondingly slower air flow speed is also possible. In this manner, it is possible to set the flow speed such that the flow speeds do not increase too sharply even in the outer region of the rotor blade, thus in the direction of the rotor blade tip, and nevertheless a sufficiently large heat transfer to the shell material, or respectively the exterior wall of the rotor blade, is possible in all partial regions, or respectively in each rotor blade section, or respectively in each leading edge section of the rotor blade.

The flow restricting apparatus is preferably provided in an exterior wall and/or in an interior wall of the first and/or second duct. An interior wall, in the scope of the invention, is particularly a wall that is disposed transverse to the flow direction in the first and/or the second duct. An exterior wall of the first and/or the second duct is a wall that bounds the first and/or the second duct outward and is disposed in the flow direction of the air flow, particularly the warm air flow, or respectively in the direction of the longitudinal extent of the rotor blade. The flow restricting apparatus is provided in an exterior wall and/or in an interior wall of the first and/or the second duct, wherein the flow restricting apparatus is spaced at a distance to the exterior wall of the rotor blade. Therefore, the flow restricting apparatus is not disposed in an exterior wall of the rotor blade.

The flow restricting apparatus preferably has an air flow passage which can be adjusted. Hereby, the flow speed, or respectively generally the flow conditions, can be adjusted in the rotor blade even during operation of the wind power plant. This can be used preferably for the purpose to provide heating in sections of the leading edge of the rotor blade or other parts of the rotor blade. In particular, the leading edge of the rotor blade can be de-iced, first in the region of the rotor blade tip, then a central region, and then a rotor blade root side region. It can also be provided to provide detectors in various sections of the rotor blade in order to provide de-icing precisely where there is icing.

The object is further solved by a method for de-icing a rotor blade of a wind power plant, wherein the rotor blade has a first and a second duct inside the rotor blade for conducting an air flow, wherein the air flow comprises a heated air flow that is fed into the first duct and flows at least in sections in the direction from the rotor blade root to the rotor blade tip in a predefined flow guidance, and for de-icing of at least one section of the rotor blade flows along at least one part of an exterior wall of the rotor blade, wherein the air flow, after having been cooled off or being cool, is guided back through the second duct toward the rotor blade root, that is further developed in that the flow speed of the air flow is set in the section and/or will be or is predetermined. By providing a set or predetermined flow speed of the air flow in the respective section, or respectively in the rotor blade, an efficient de-icing of the rotor blade is possible, and particularly also in the rotor blade tip, because even in the rotor blade tip an efficient de-icing is possible by setting a sufficiently slow speed of air flow there.

Preferably, the flow speed and/or the flow guidance is modified, particularly during operation of the wind power plant. The modification occurs here preferably depending on time, or depending on the actual state of icing of the respective sections of the rotor blade. The flow speed and/or the flow guidance can be set differently particularly during operation of the wind power plant, in order to heat various spaces or sections, or respectively various regions, of the exterior wall of the rotor blade at different times, in order to provide de-icing.

Sections of the rotor blade disposed one after the other in the longitudinal extent of the rotor blade are preferably heated at different times. Preferably, the leading edge region of the rotor blade is heated because the leading edge region is typically the region most strongly affected by icing.

Flow restricting apparatuses, whose passages are adjusted, are preferably provided in the ducts and/or between the ducts. The ducts are the first, the second and/or the third duct. The size of the passages that can also be characterized as air flow passages, can preferably be set to the same size to some extent. All passages can also be the same size. However, these passages can also be formed of different sizes as needed. The air flow passages can also be closed in sections, for example when not the entirety of the rotor blade at the leading edge of the rotor blade is to be heated, and also when the leading edge of the rotor blade is not to be heated, over the entire longitudinal extent of the rotor blade, but rather only sections should be heated.

The heated air flow is fed, preferably, at least temporarily, particularly at pre-determinable time intervals, into the second duct and flows at least in sections in the direction from the rotor blade root to the rotor blade tip, wherein the air flow, after being cooled off or cool, is returned through the first duct to the rotor blade root. Due to these measures, the inflow of the air flow, or the feed of the heated air, and the return flow are temporarily interchanged. With this, there is a temporary reversal of the flow direction. This way, large differences are possible between the inflow temperature and the return flow temperature, because the heating of the rotor blade material occurs only briefly. Hereby larger heat quantities are possible with small flow cross sections.

In addition, it is also possible to de-ice the outer surfaces of the rotor blade adjacent to the duct 1 and duct 2 one after another. The inflow temperature is preferably approximately 60° C. Although higher temperatures are desirable in order to de-ice large rotor blades having lengths of more than 50 m, above 80° C., the limited temperature stability of typical rotor blade materials permit only very short heating cycles.

The first air flow passage opening can be provided approximately 30 m, for example, from the rotor blade root. The return flow temperature can be 10° C. The flow speed is preferably 10 m/s. The heating power is 20 kW. In the scope of the invention, the first duct can also be the second duct, and vice versa.

Figure 2:
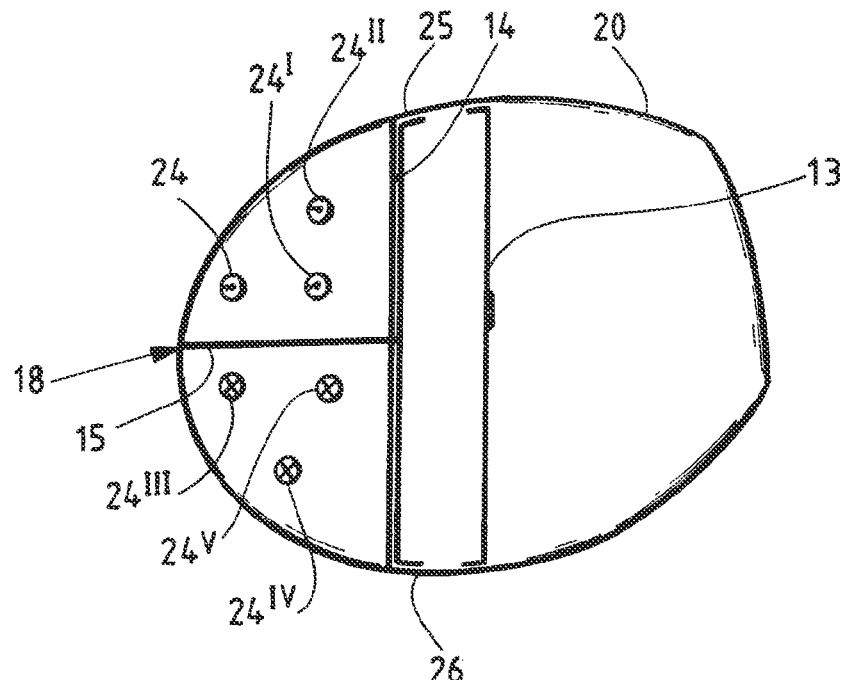
Figure 3:
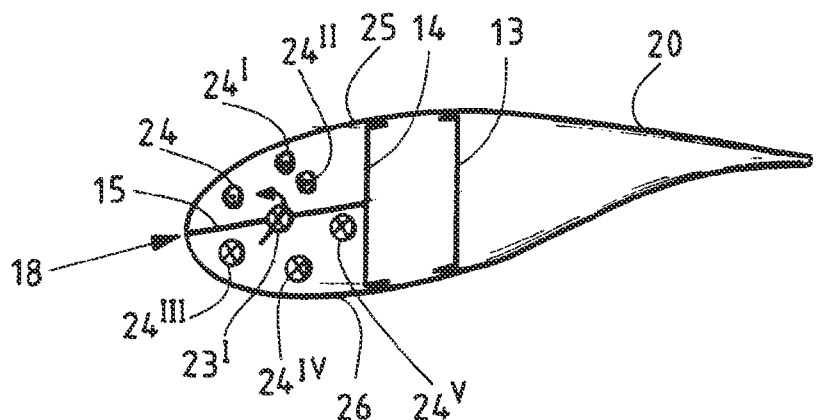
Figure 4:
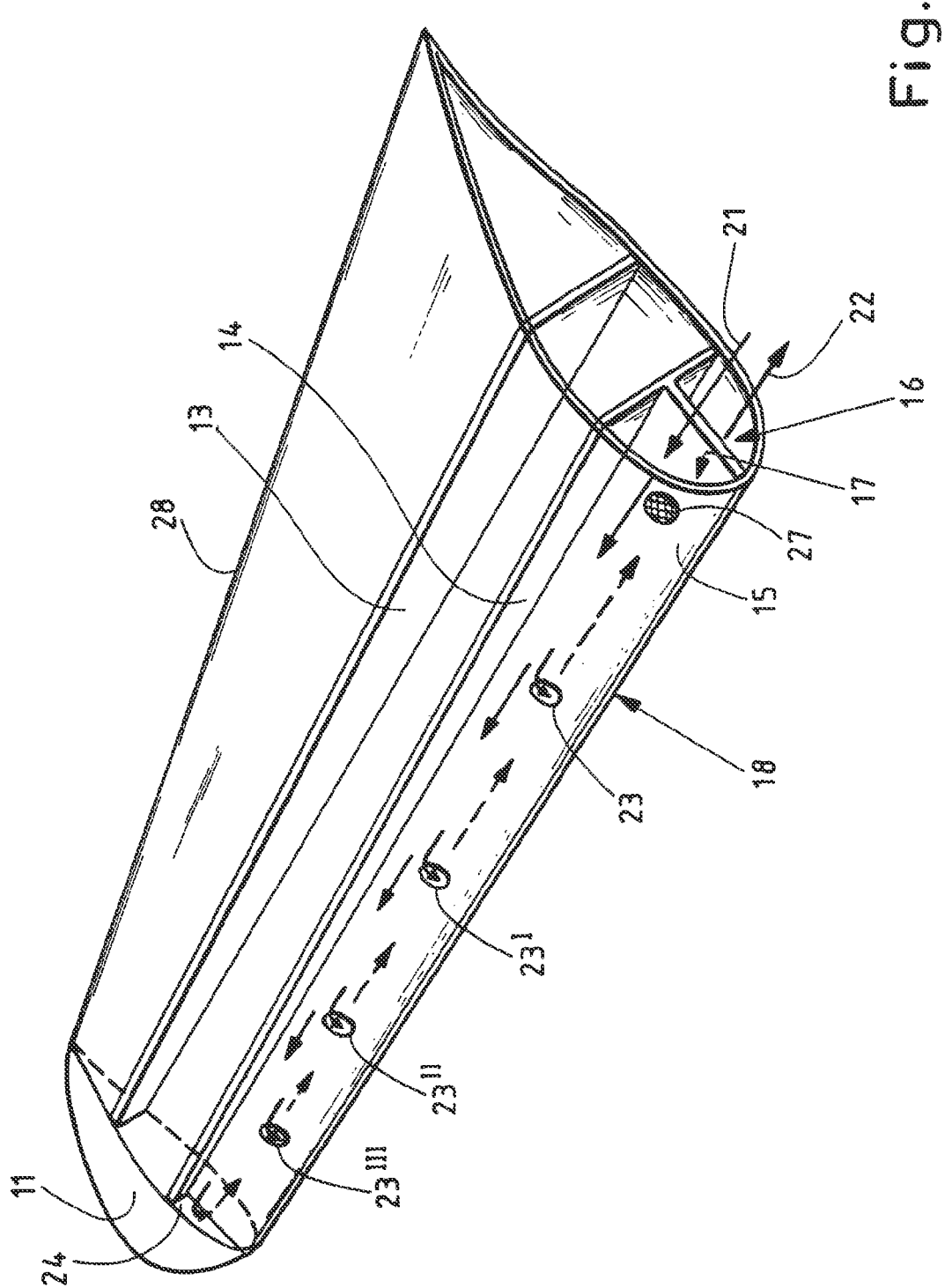
Figure 5:
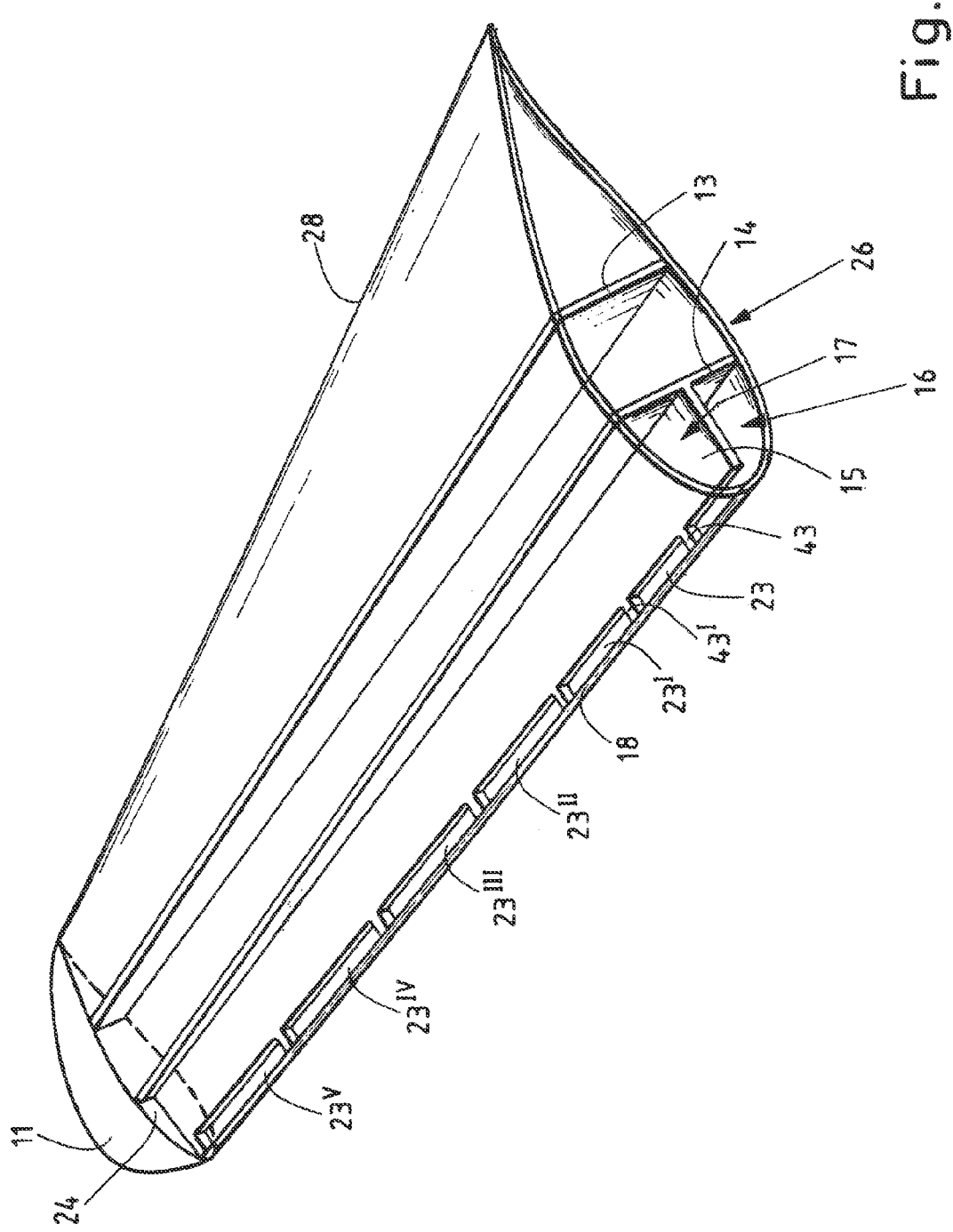
Figure 8:
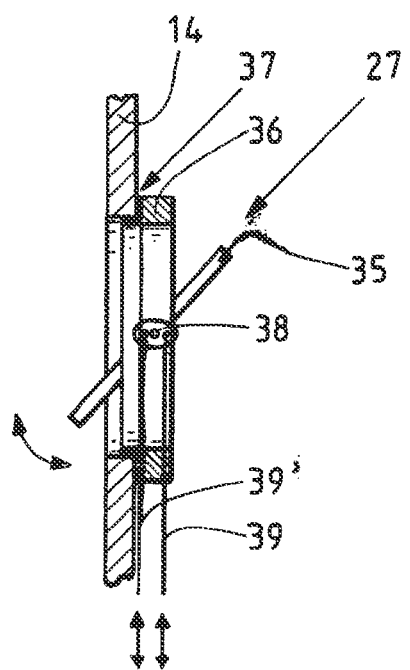
Figure 9:
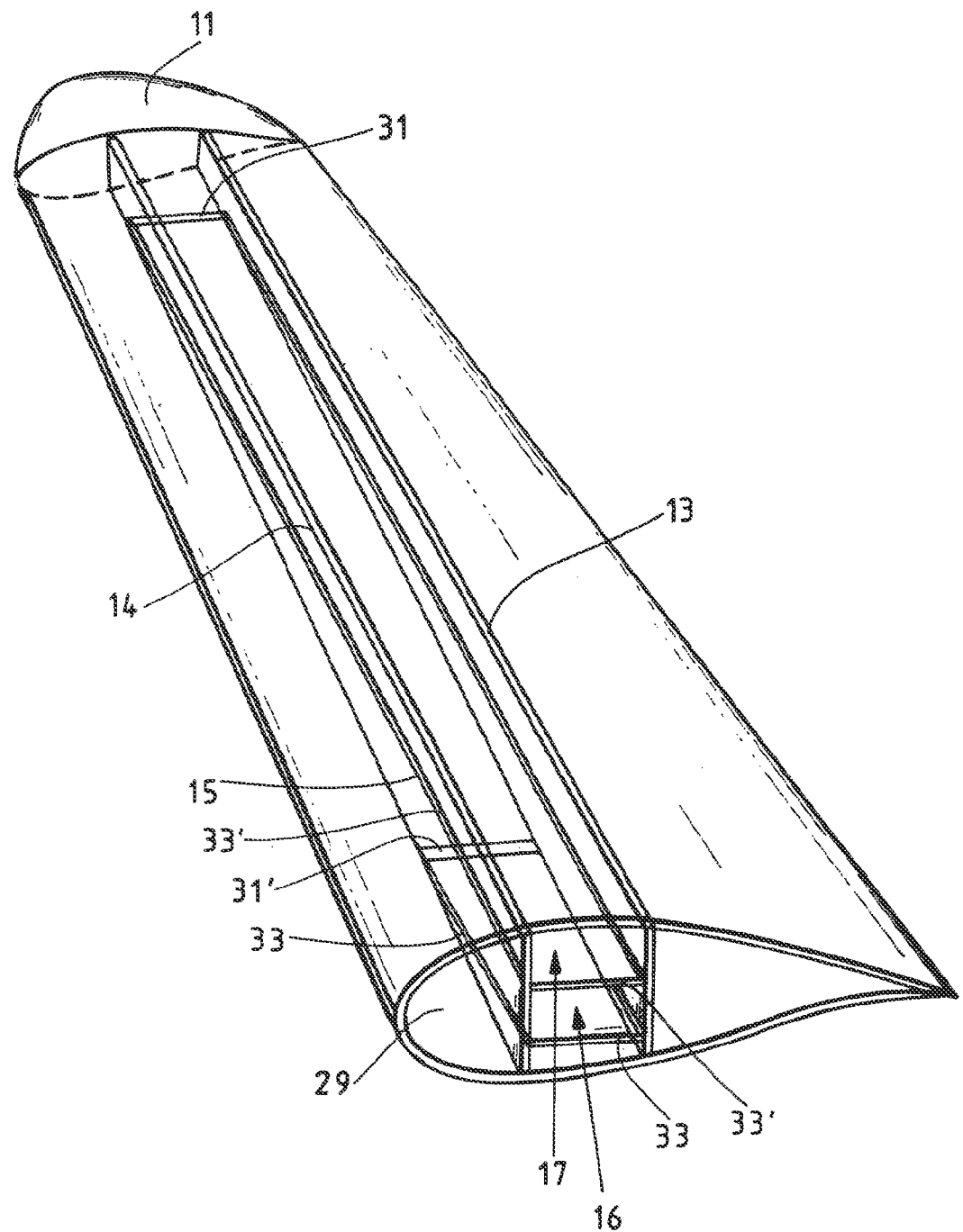

The invention is described below, without restricting the general idea of the invention, using exemplary embodiments with reference to the drawings, whereby we expressly refer to the drawings with regard to the disclosure of all details according to the invention that are not explained in greater detail in the text. In the figures:

FIG. 1 shows a schematic "transparent" three dimensional representation of a rotor blade according to the invention, FIG. 2 shows a representation of a section through a rotor blade according to the invention in the vicinity of the rotor blade root, FIG. 3 shows a schematic representation of a section through a rotor blade according to the invention in the vicinity of the rotor blade tip, FIG. 4 shows a schematic "transparent" three dimensional representation of a part of a rotor blade according to the invention in a further embodiment, FIG. 5 shows a schematic "transparent" three dimensional representation of a further embodiment of a part of a rotor blade according to the invention, FIG. 6 shows a schematic sectional top view of a part of a rotor blade according to the invention in a further embodiment, FIG. 7 shows the part of the rotor blade according to the invention from FIG. 6 in a schematic side view seen from the leading edge of the blade, FIG. 8 shows a schematic sectional representation through a flow restricting apparatus disposed in a web, and FIG. 9 shows a three dimensional "transparent" representation of a part of a rotor blade according to the invention in a further embodiment.

In the following figures, the same or similar types of elements or respectively corresponding parts are provided with the same reference numbers so that a corresponding re-introduction can be omitted.

FIG. 1 shows a rotor blade 10 according to the invention having a rotor blade tip 11 and a rotor blade root 12 in a schematic "transparent" three-dimensional representation. The rotor blade 10 has a suction side 25 and a pressure side 26. The rotor blade is correspondingly provided with an exterior wall 19 that separates the interior region from the exterior region. The exterior wall is typically also designated as a shell, and is manufactured from a shell material such as glass fiber reinforced plastic for example. For reinforcing the strength of the rotor blade, two webs 13 and 14 are provided that extend in the longitudinal extent 40 of the rotor blade from the suction side 25 to the pressure side 26, and are bonded to the shell material, or respectively to the exterior wall 19 of the rotor blade 10. Corresponding airfoils 20, which show the cross-sectional shape of the rotor blade 10, are represented in the rotor blade 10.

A partition wall 15, which separates the first duct 16 and the second duct 17 from one another, is provided in the longitudinal extent 40 of the rotor blade 10 and transverse to the extension of the webs 13, or respectively 14. A warm air flow 21 can now be introduced into the first channel 16, as shown by the arrows in the direction of the rotor blade tip. This warm air flow serves the purpose of melting possible ice at the leading edge of the rotor blade 18 by heat such that accordingly, ice can fall off from the rotor blade 10. The warm air flow cools off on the way to the rotor blade tip 11, starting at 60° C. to 10° C. for example, so that a cold airflow 22 is returned again at the rotor blade root 12. In addition, openings 23, 23' and 23" are provided in the partition wall 15 in order to transfer the warm air flow from the first duct into the second duct. An equalization of the flow speed occurs due to the provisioning of the openings 23, 23' and 23". The openings 23 to 23" can be formed adjustable using throttle flaps, for example, not shown here. This is however not absolutely necessary in order to provide equalization of the flow speed. Providing corresponding throttle flaps has other, or respectively further, advantages that will be described with reference to the additional figures. For improved illustration, the trailing edge 28 of the rotor blade 10 is also indicated in FIG. 1.

According to the example embodiment according to FIG. 1, a suction side and a pressure side cavity, or respectively duct, are provided in the rotor blade 10 that are used as inflow and return flow for warm air. In particular, the inflow duct is optimized with respect to cross-sectional geometry and arrangement in the rotor blade so that minimal heat loss occurs in order to efficiently heat the iced leading edge of the blade. For this purpose, the cross sectional area, preferably in each section of the rotor blade, is selected such that the resulting flow speed represents an optimal compromise between faster speed for reducing the heat dissipation and slower speed for minimizing the frictional losses. The dimensioning occurs using thermodynamic design considering the heat losses over the duct walls and the flow losses due to the duct geometry and the heat dissipation over the leading edge of the blade to be heated. In addition, as shown in the following figures, a division into multiple sections is provided in order to provide sufficient warm air in all critical blade regions even with larger blade lengths, for example of over 40 m.

FIG. 1 provides the incorporation of a partition wall 15, running substantially parallel to the airfoil chord, between the leading edge of the rotor blade 18 and approximately the middle of the front thrust web 14. The partition wall 15 can be implemented, like the webs 13 and 14, as a sandwich with high heat insulation, or alternatively with the lowest possible construction expense from flexible material, truck tarpaulin for example or, if the temperature resistance is not sufficient, from a hot air balloon cover material.

The inflow is preferably implemented where lower heat losses are anticipated at the duct walls, in order to provide a sufficient quantity of heat at the leading edge of the blade in the outer region of the blade. The cross sectional areas of inflow and return flow are preferably approximately similar. For the inflow, however a thermodynamic optimization is particularly expedient.

Preferably, a plurality of passages or respectively openings 23-23" are provided in the partition wall over the entire length of the rotor blade 10 in order to attain an equalization of the temperature progression over the length of the blade. Preferably however, a higher return temperature is set in the outer region of the rotor blade at the blade tip than in the inner region at the blade root because the icing is less critical there.

Adjustable throttle flaps are preferably provided in the passages, or respectively openings 23-23''', that allow an individual adjustment of the temperature in the individual sections for each rotor blade. In addition, the throttle flaps can serve the purpose to set the adjustment depending on the operating state. The adjustments can be different specifically at a standstill, during spinning, or in production operation. During production operation, a particularly large quantity of heat is required particularly in the outer region of the blade because the cooling due to the high flow speed of the external air is at the highest. This can be attained by means of a higher inflow temperature and/or an average flow speed, or respectively flow speed that is not too fast in the region of the leading edge of the blade, in order to enable a highest possible heat transfer. The ambient conditions, such as external temperature, the wind speed and direction, and precipitation, etc. can also be considered in order to set the throttle flaps.

Furthermore, only section by section blade heating, as shown particularly in the following Figures, is possible if the provided heating energy is not sufficient for de-icing the entire rotor blade due to the boundary conditions, because the heating is already at full load operation for example. In addition, this can be necessary with de-icing at standstill under particularly unfavorable conditions, for example during extreme cold with high wind speeds. In this case, the de-icing can occur then for the individual sections one after the other.

FIG. 2 shows a schematic section through a rotor blade in the embodiment according to FIG. 1. The flow direction of the air flow is represented using flow arrows $24\text{-}24^V$ by X'es (pointing into the drawing page) and dots (coming out of the drawing page).

FIG. 3 shows a schematic representation of a further airfoil that is provided closer to the rotor blade tip 11 than in FIG. 2. Here, in addition to the flow arrows $24\text{-}24^V$, an opening 23' is also represented that is provided in the partition wall 15. A throttle flap can be seen here that is set open, and a corresponding air flow is represented by an arrow that indicates that the warm air flow passes through this opening 23' and from the first duct into the second duct.

FIG. 4 shows a part of a rotor blade according to the invention in a further embodiment that is similar to the embodiment according to the FIGS. 1 to 3, in a schematic three-dimensional and transparent representation. The partition wall 15 is also shown here, and corresponding openings 23-23''' are provided in the partition wall 15. The associated air flow 21, or respectively 22, is also represented.

A warm air flow 21 is fed into the upper duct, which is the second duct 17, and arrives back in the lower duct, which is the first duct 16, as a cold air flow 22. The cold air flow is shown dashed. The warm air flow 21 enters from the second duct 17 via the respective openings 23-23''' into the first duct 16. In addition, an opening 24 is provided in the blade tip by means of which an overflow of the warm air flow 21 is also possible from the second duct 17 into the first duct 16. Also, a closed throttle flap apparatus 27 is shown here that ensures a flow of the warm air flow 21 from the second duct 17 into the first duct 16 occurs only in a section that is disposed closer to the rotor blade tip.

The openings 23-23''' can also be provided with throttle flap apparatuses that are however not represented here. The separation distance from outside toward the rotor blade tip 11 can hereby be designed preferably decreasing. Due to the separation distance, preferably designed decreasing, the tapering, in particular strongly tapering, of the available flow cross sections in the outer region of the rotor blade, thus toward the rotor blade tip, is sufficiently taken into consideration. This refers to the separation distance of the openings 23-23''', or respectively of the throttle flap apparatuses 27.

The flow direction in FIG. 4 is the reverse of the flow direction shown in FIG. 1. A corresponding reversal of the flow direction can be possible in a particularly advantageous embodiment using a flap system or fan or blower in the region of the blade root or rotor hub, that is adjustable, or respectively reversible in the direction of rotation, or pivotable. Hereby, the top and bottom of the leading edge of the blade can be efficiently de-iced. The de-icing can also occur in turns, or respectively alternating.

An alternative possibility is shown in FIG. 5, in which respective openings 23-23''' that are constructed as slits, are provided in the region of the leading edge of the blade. The partition wall 15 is then supported by corresponding retaining ribs 43, 43', which can be bonded in the lower shell of the blade, for example, thus in this case, in the pressure side. FIG. 5 shows the outermost 30% of the length of the entire rotor blade as an example. The width of the slits of the openings 23-23$^V$ can be the same or varied. Retaining ribs 43, 43' are provided between the openings.

A further very preferred embodiment is shown in the FIGS. 6 and 7. FIG. 6 shows a schematic representation in a top view of a respective section of a rotor blade according to the invention, and FIG. 7 shows a corresponding side view of the leading edge, thus a view from the front.

In this example embodiment, a total of three ducts are provided, wherein the first and the second duct 16 and 17 are separated at a distance from the leading edge of the rotor blade 18 of the rotor blade 10. The first duct 16 and the second duct 17 are disposed between the webs 13 and 14. The first duct 16 serves as a cold air flow return conveyance duct and is provided in the example embodiment of the FIGS. 6 and 7 above the warm air flow supply duct 17, thus the second duct 17.

FIG. 6 does not show the first duct 16 itself, but rather only the cold air flow 22, which flows into the first duct 16, thus above the warm air flow 21, and is thus indicated above the plane of the drawing. In the second duct 17, which serves as a warm air flow supply duct, the exits of the duct walls 33, or respectively 33', are projected from FIG. 7 and are labeled with 31 and 31'. Here, these are respective exit edges, or respectively edges 31 and 31'. In the web 14, there are a plurality of throttle flap apparatuses 27-27' which are provided for feeding the warm air flow into a third duct, namely the leading edge duct 29.

Due to this specific embodiment, heat insulating materials can be provided as exterior walls of the second duct 17 so that a warm air flow can be conducted in the leading edge region of the outermost region of the rotor blade without substantial heat losses. The leading edge region of the rotor blade 10 is divided in this example into four sections 32-32'. In this manner, it is possible by closing or opening the throttle flap apparatuses 27-27' to provide an efficient and particularly also sequential heating of the respective sections 32-32'.

After conducting the warm air flow into the leading edge duct 29, this flow is then conducted, as shown by the dashed lines, through openings 34-34'' into the return duct, or the first duct 16, in order to arrive at the rotor blade root and to be able to be returned there for example again into the air flow circulation, in a blower for example, not shown in the Figures, that also provides a heating apparatus.

The warm air flow can be guided correspondingly through the openings 41-41''' in the leading edge duct 29, wherein the openings 41-41'' can be closed with respective throttle flaps, or respectively throttle flap apparatuses 27'-27'.

The walls of the supply duct from the FIGS. 6 and 7, thus the second duct 17, can be preferably heat insulated or thermally insulated. The webs 13 and 14 are typically already present as a sandwich structure. The partition wall 15 and the upper and lower terminal wall 33 can be respectively constructed also in a sandwich structure. Due to the arrangement shown, it is possible to guide the supply duct 17 over the majority of the rotor blade length (for example the inner 80%) away from the cool blade shell such that the heat losses are minimal.

FIG. 8 shows a schematic sectional representation of a corresponding throttle flap apparatus 27, which is bonded into the rotor blade web 14 using a bonded connection 37. A corresponding flange 36 is provided into which the throttle flap 35 is inserted. The opening of the throttle flap apparatus can be adjusted using an eccentric 38 and corresponding Kevlar wires 39, 39'. Instead of the Kevlar wires, other wires can also be used, or an adjustment can be provided without wires and only with stepper motors, pneumatic cylinders or other drives, for example. Kevlar wires are very suitable however, because they are relatively resistant to stretching and are lightweight.

In a simple embodiment, the throttle flaps, or respectively the throttle flap apparatuses 27 are adjusted only once, manually for example, thus, adjusted for the specific rotor blade so that a uniform heating of the leading edge of the blade is achieved over the entire blade length to be de-iced.

In a further development it is provided to adjust the throttle flaps during operation. The throttle flaps can be activated using non-metallic Kevlar wires or connecting rods for example such as glass fiber reinforced tubes, in laminated empty tubes, and can be controlled in a targeted manner considering the signals from ice sensors, e.g., using a thermal camera, vibration analysis or surface sensors.

The necessary additional partition walls 15, or respectively 33, are preferably installed during manufacturing, with the introduction of the webs 13 and 14 into a shell of the rotor blade. Here, either the blade shell of the suction side or the pressure side can be selected, which enables a favorable geometry for the leading edge bonding. In particular, the partition wall 15 can replace an additional bonding strap in the leading edge region, and improve the geometry for the blind bond.

The first variant according to the FIGS. 1 to 5, has the advantage of a relatively simple design with only one partition wall. It can be possible however that the front web 14 in the outer region is relocated towards the back to the end edge 28 for providing a sufficiently large flow cross section. In this case, the rear web 13 should be relocated toward the front in order to maintain the shear center. If the outer region of the blade is divided into a sufficient number of partial sections, the previously unproblematic construction can be maintained because very small flow cross sections of the leading edge of the blade are sufficient.

During operation it can be provided to regularly or sporadically exchange the inflow and the return flow of the air flow through a corresponding flap arrangement at the fan in the blade root region, for example in intervals between 1 minute and 15 minutes. With this, significant differences between the inflow and return flow temperature can be acceptable which enables particularly providing larger quantities of heat with small flow cross sections. The inflow temperature can then be up to 100° C. for example.

With the variant according to the FIGS. 6 and 7, a significantly reduced effort is given with the integration into the blade structure because all internals and respective partition walls, which are necessary, are disposed directly at the webs 13 and 14, and no modifications are necessary in the blade shell. A significant advantage with this embodiment is the optimal insulation of the inflow duct in the center of the rotor blade. The inflow duct is then at a separation distance specifically to the exterior walls, or respectively to the blade shells of the rotor blade. Hereby, minimal heat loss is maintained even in rotor blades with lengths of 40 m to 70 m. In addition, the temperatures in the individual leading edge blade sections 32-32''' can be controlled very precisely and independently of each other using respective throttle flaps, or respectively throttle flap apparatuses 27.

The warm air from the inflow can be conducted in each case through a passage, preferably round for strength reasons, or respectively a round opening in the web into the leading edge of the blade. There, the heat is transferred to the blade surface and then directed through a return passage, or respectively through an opening through the web, into the return duct. For this purpose, the return passage, or respectively the opening, is preferably round and in particular, preferably designed the same as the opening for the inflow, thus, circular. Here, the lengths of the blade leading edge sections 32-32' and the openings are preferably to be optimized by a thermodynamic calculation. Throttle flap apparatuses can be deployed expediently for the inflow openings 27-27''', but are however not mandatory. No throttle flap apparatuses are necessary for the return openings. However, flow guide surfaces 30-30'' are expedient. The flow guide surfaces, which can also be labeled as transverse walls 30-30'', simultaneously divide the leading edge sections.

The blade leading edge 18, or respectively the blade leading edge duct 29, is not used as a flow duct, but rather serves for transferring the heat to the blade surface. It is expedient, particularly in this case, to improve the thermal conductivity of the leading edge shell, or respectively of the exterior wall toward the leading edge. In the most simple case, this can be accomplished using the thinnest possible blade shell without sandwich structures in the freezing regions, or by more effective measures such as the introduction of a honeycomb structure that is open toward the inside, or a sandwich structure, with which the warm air is introduced into the support layer, e.g., using tubes with diameters of a few centimeters. However, targeted heat bridges, e.g. grounded metal inlays or similar can also improve the conductivity towards the surface. It is further possible, to omit the de-icing of the relatively non-critical blade inner regions, thus toward the rotor blade root.

The variant of the FIGS. 6 and 7 attains better effectiveness than the variant according to the FIGS. 1 to 5. The latter named variant is however particularly effective for de-icing the blade root side region of a large rotor blade, where in contrast, the initially named variants according to the FIGS. 6 and 7 is particularly suited to de-icing the outer region of a large rotor blade.

Thus, a particularly advantageous embodiment provides, particularly in the case of very low external temperatures, to switch between the two variants in order to be able to de-ice one after the other the (blade root side) inner region and the (blade tip side) outer regions using the available limited heat pipeline. For this purpose, the rotor blade according to the FIGS. 6 and 7 has a divided leading edge duct, as is shown in FIG. 3. The switch can occur preferably using a flap arrangement in the blade root region or the rotor hub, which, together with the adjustable throttle flaps, allows the desired steering of the air flow. In this embodiment, throttle flaps are preferably also disposed in the transverse walls 30, and during operation are completely opened according to FIG. 3.

FIG. 9 shows a three-dimensional schematic "transparent" representation of a part of a rotor blade according to the invention in a further embodiment. For clarity, the openings 34 to 34" and the throttle flaps 27 to 27'" were omitted. In addition, compared to the example embodiment in the FIGS. 6 and 7, the upper terminating wall 33' is not curved upward toward the blade shell in the direction of the rotor blade tip 11, but rather ends with an edge 31 in the region of the rotor blade tip 11, wherein for enabling a large cross-section in the second duct 17 a large cross-section is provided for transferring the air flow into the leading edge region, thus, into the leading edge duct 29 in the region of the rotor blade tip. This can be provided both for supplying warm air from the second duct 17 into the leading edge duct 29 as well as for the return guidance of the already cooled air from the leading edge duct 29 into the second duct 17.

In contrast to the embodiment according to the FIGS. 6 and 7, the upper terminal wall 33' is guided toward the lower blade shell in the region of the rotor blade tip 11. This embodiment is particularly suited for a warm air flow, which is guided through the second duct 17 in the direction of the rotor blade tip 11, and then at the latest in the region of the rotor blade tip is guided into the leading edge duct 29, or respectively already before to corresponding openings or flow throttle apparatuses which are however not represented in FIG. 9., in order to be subsequently led back again through the first duct 16 in cooled form in the direction of the rotor blade root.

Due to the invention, a very simple design is possible compared to alternative concepts such as heating foils or heating wires or the like. In addition, a very simple integration into an existing blade structure is possible. Moreover, the warm air flow can be simply adapted to different operating circumstances and environmental conditions.

All named features, including those to be taken from the drawings alone, and individual features, which are disclosed in combination with other features, are considered individually and in combination as essential to the invention. Embodiments according to the invention can be fulfilled through individual features or a combination of several features.

LIST OF REFERENCES 10 rotor blade
11 rotor blade tip
12 rotor blade root
13 web
14 web
15 partition wall
16 first duct
17 second duct
18 rotor blade leading edge
19 exterior wall
20 airfoil
21 warm air flow
22 cold air flow
23, 23', 23", 23'", 23$^{IV}$, 23$^{V}$, opening
24, 24', 24", 24'", 24$^{IV}$, 24$^{V}$ flow arrows
25 suction side
26 pressure side
27, 27', 27" throttle flap apparatus
28 end edge
29 leading edge duct
30, 30', 30" transverse wall
31, 31' edge
32, 32', 32", 32'" section
33 lower terminal wall
33' upper terminal wall
34, 34', 34" opening
35 throttle flap
36 flange
37 bonded connection
38 eccentric
39, 39' Kevlar wire
40 longitudinal extent
41, 41', 41", 41'" opening
43, 43' retaining rib

The invention claimed is:

1. A rotor blade of a wind power plant comprising:
a first duct that feeds airflow through the rotor blade and is located at a pressure side of the rotor blade;
a second duct that removes the airflow from the rotor blade and is located at a suction side of the rotor blade wherein at least one of the first duct and the second duct has an exterior wall of the rotor blade as a wall;
two webs that are arranged substantially in a longitudinal extent of the rotor blade so that both the first duct and the second duct are arranged between the two webs of the rotor blade, the webs being bonded to the exterior wall of the rotor blade so as to reinforce a strength of the rotor blade, wherein the webs each extend from the pressure side to the suction side of the rotor blade; and
a partition device is provided which separates the ducts from one another so that the first duct is arranged on a first side of the partition device at the pressure side of the rotor blade and the second duct is arranged on a second side of the partition device at the suction side of the rotor blade.

2. The rotor blade according to claim 1,
wherein the partition device includes a partition wall at least in sections, that is arranged substantially in the longitudinal extent of the rotor blade, and transverse to the webs of the rotor blade.

3. The rotor blade according to claim 1, wherein the ducts are air conducting ducts.

4. The rotor blade according to claim 1,
wherein at least one of the first duct and the second duct includes a wall that has at least one opening that allows a connection to a third duct, and
wherein the third duct has the exterior wall of the rotor blade as a wall.

5. The rotor blade according to claim 1, wherein at least one wall of the first or the second duct is heat insulated at least in sections.

6. The rotor blade according to claim 1, wherein shell material of the rotor blade in the region of a leading edge of the rotor blade is permeated with thermal conductive material.

7. The rotor blade according to claim 1, wherein at least one of the first and the second ducts is disposed at a distance to the exterior wall of the rotor blade.

8. The rotor blade according to claim 1, wherein at least one of the first and the second ducts has a flow restricting apparatus.

9. The rotor blade according to claim 8, wherein the flow restricting apparatus is provided in at least one of the exterior wall and an interior wall of the first and/or the second duct.

10. The rotor blade according to claim 8, wherein the flow restricting apparatus has an air passage that can be adjusted.

11. A method for de-icing a rotor blade of a wind power plant, comprising the steps of:

providing a rotor blade having a first duct located at a pressure side of the rotor blade and a second duct located at a suction side of the rotor blade, the ducts being disposed so as to longitudinally extend inside the rotor blade, wherein at least one of the first duct and the second duct has an exterior wall of the rotor blade as a wall;

providing two webs that are arranged substantially in a longitudinal extent of the rotor blade so that both the first duct and the second duct are arranged between the two webs of the rotor blade, the webs being bonded to the exterior wall of the rotor blade so as to reinforce a strength of the rotor blade, wherein the webs each extend from the pressure side to the suction side of the rotor blade;

conducting an air flow with the first duct and the second duct, wherein the air flow comprises a heated air flow which is introduced into the first duct and flows in a predetermined flow path at least in sections in the direction from a rotor blade root to a rotor blade tip, and de-icing at least one section of the rotor blade with the air flow that flows along at least one part of an exterior wall of the rotor blade, wherein the first duct feeds the air flow through the rotor blade and the second duct removes the air flow from the rotor blade, and wherein the flow speed of the air flow in the at least one section is set.

12. The method according to claim 11, wherein the flow speed and/or the flow path is modified particularly during the operation of the wind power plant.

13. The method according to claim 11, wherein sections of the rotor blade disposed one after the other in the longitudinal extent of the rotor blade are heated at different times.

14. The method according to claim 11, wherein a leading edge region of the rotor blade is heated.

15. The method according to claim 11, wherein flow restricting apparatuses, the passages of which can be adjusted, are provided in the first and second ducts and/or between the first and second ducts.

16. The method according to claim 11, wherein a flow direction is reversed temporarily.

17. A rotor blade of a wind power plant, comprising:
a first duct that feeds airflow through the rotor blade and is located at a pressure side of the rotor blade;
a second duct that removes the airflow from the rotor blade and is located at a suction side of the rotor blade, wherein the first duct and the second duct are arranged substantially in a longitudinal extent of the rotor blade, and wherein at least one of the first duct and the second duct has an exterior wall of the rotor blade as a wall; and
two webs that are arranged substantially in the longitudinal extent of the rotor blade so that both the first duct and the second duct are arranged between the two webs of the rotor blade, the webs being bonded to the exterior wall of the rotor blade so as to reinforce a strength of the rotor blade, wherein the webs each extend from a pressure side to a suction side of the rotor blade.

\* \* \* \* \*

UNITED STATES PATENT AND TRADEMARK OFFICE
CERTIFICATE OF CORRECTION

PATENT NO. : 9,169,830 B2  
APPLICATION NO. : 13/715453  
DATED : October 27, 2015  
INVENTOR(S) : Weitkamp et al.

Page 1 of 1

It is certified that error appears in the above-identified patent and that said Letters Patent is hereby corrected as shown below:

On Title Page, item [72], Inventors, after "Roland Weitkamp", delete "BELM (DE)" and insert --OSNABRÜCK (DE)--.

Signed and Sealed this  
Twenty-fourth Day of May, 2016

Michelle K. Lee  
*Director of the United States Patent and Trademark Office*